United States Patent [19]

Okajima et al.

[11] Patent Number: 4,502,128
[45] Date of Patent: Feb. 26, 1985

[54] TRANSLATION BETWEEN NATURAL LANGUAGES

[75] Inventors: Atsushi Okajima, Yokohama; Yoshihiko Nitta, Fujisawa; Fumiyuki Yamano, Kawasaki, all of Japan

[73] Assignee: Hitachi, Ltd., Tokyo, Japan

[21] Appl. No.: 383,952

[22] Filed: Jun. 1, 1982

[30] Foreign Application Priority Data

Jun. 5, 1981 [JP] Japan .................................. 56-85722

[51] Int. Cl.³ ............................................. G06F 15/38
[52] U.S. Cl. ..................................... 364/900; 364/419
[58] Field of Search ................ 364/900, 419; 434/167, 434/157, 169, 176

[56] References Cited

U.S. PATENT DOCUMENTS

| | | | |
|---|---|---|---|
| 4,339,806 | 7/1982 | Yoshida | 364/900 |
| 4,355,370 | 10/1982 | Yanagiuchi | 364/900 |
| 4,412,305 | 10/1983 | Yoshida | 364/900 |
| 4,417,319 | 11/1983 | Morimoto et al. | 364/900 |

*Primary Examiner*—Jerry Smith
*Assistant Examiner*—Michael R. Fleming
*Attorney, Agent, or Firm*—Antonelli, Terry & Wands

[57] ABSTRACT

An input sentence described by a first natural language is sectioned into individual words. Parts of speech corresponding to the individual words are retrieved from a lexical word storage, whereby the input sentence is described by a corresponding string of the parts-of-speech as retrieved. A translation pattern table is previously prepared which defines correspondence between patterns of strings of parts-of-speech for the first natural language and those for a second natural language by which corresponding output sentence is to be described. By referring to the translation pattern table, the string of the parts-of-speech of the input sentence is transformed into a corresponding string of the parts-of-speech for the second natural language. The output sentence described by the second natural language is generated by sequencing target words in accordance with the sequential order of the parts of speech of the string pattern obtained after the transformation.

11 Claims, 8 Drawing Figures

| WORD | PARTS OF SPEECH | TARGET WORD |
|------|-----------------|-------------|
| WHAT | WH | なに ＊ |
| DO | DO | する ＊ |
| YOU | N | あなた ＊ |
| WANT | V | 望む ＊ |
| TO | TO | こと ＊ |
| EAT | V | 食べる ＊ |
| ? | Q | |

WHAT DO YOU WANT TO EAT ?

あなたは何を食べることを望むか

WORK REGISTER

FIG. 7

| NO. | STRING PATTERN IN ENG | | | | T | STRING PATTERN IN JAP. | | | |
|-----|---|---|---|---|---|---|---|---|---|
| 1 | N | BE | ING | N | 2 | 1は＊ | 4を＊ | 3している＊ | |
| 2 | N | BE | ING | N | 1 | 1は＊ | 3している＊ | 4である＊ | |
| 3 | GOD | MRN | | | | ＃ | おはよう | | |

FIG. 8

| NO. | STRING PATTERN IN JAP. | | | | STRING PATTERN IN ENG. | | | | |
|-----|---|---|---|---|---|---|---|---|---|
| 1 | N | | WH | V | Q | WH | DO | N | V | ? |
| 2 | | | | | | | | | | |

FIG. 6

TRANSLATION BETWEEN NATURAL LANGUAGES

BACKGROUND OF THE INVENTION

The present invention relates to translation of sentences expressed in a natural language into corresponding sentences expressed in another natural language, and more particularly to a method and an apparatus for carrying out the translation.

Although the present invention can be applied to translation between any of a plurality of natural languages, it is assumed in the following that the invention is applied to translation of English sentences into Japanese sentences and vice versa for the convenience of description.

Methods for machine translation and translators heretofore proposed or commercially available may be categorized into three classes as follows:

The first class includes those translators which are destined for translation of English words (or Japanese words) into Japanese words (or English words), i.e. those serving for storage of words or dictionaries, so to speak.

The second class includes those translators destined for translation of relatively simple sentences, such as sentences manipulated as a whole and frequently used sentences (e.g. "How are you?", etc.). Those translators which perform translation by replacing some words constituting parts of a sentence by other words also belong to this second class.

The third class includes those translators which can perform translations between complex sentences of given patterns by parsing. A typical one belonging to this class is disclosed in Japanese Laid-Open Patent Application No. 102071/1980.

Among the translators belonging to the second class mentioned above, commercially available handy translators for travellers' in foreign countries are one example.

The handy translator of this type stores therein the frequently used sentences classified into sections such as "In Plane", "At Restaurant", "At Customs" and so forth in accordance with situations which the traveller will encounter. In use, the traveller first selects the section which he desires to confer with by operating associated keys. Next, upon actuation of a search key, sentences which are frequently used in the situation corresponding to the selected key are sequentially displayed one after another. When a sentence of interest which the traveller wants to use is displayed, a translation key is operated, whereupon a translated sentence corresponding to the selected sentence is displayed.

The handy translator of the type described above is in principle substantially same as those belonging to the first category in respect to the fact that pairs of the frequently used Japanese sentences and corresponding English sentences are previously stored in a memory, wherein the sentence as required on occasion is selected to be displayed in a corresponding English (or Japanese) expression.

Accordingly, in order to make it possible to translate a great variety of sentences, not only a memory of an enormously great capacity is required, but also the procedures for selecting a sentence to be translated become much more complicated, to a great disadvantage.

In the case of the translator machine or apparatus belonging to the third category described above, an English text inputted to the translator apparatus is translated into a sentence of a target (output) language through processes of parsing and retrieval of correspondent or target words by resorting to the dictionary access, as is described in the Japanese Laid-Open Patent Application No. 102071/1980 cited above. The translator apparatus of this class can certainly deal with translations of numerous sentences of various patterns. However, it requires a high-speed computer of a large scale, involving great expense and thus providing obstacles to the common use on a home basis.

SUMMARY OF THE INVENTION

An object of the present invention is to provide a method for translation as well as a translator apparatus which can enjoy the advantageous features of both the second and the third categories described hereinbefore.

Another object of the present invention is to provide a method for translation as well as a translator apparatus which can be implemented inexpensively by using a usual micro-computer and is capable of translating sentences of relatively complex patterns or structures in addition to the frequently used sentences.

In view of the above objects, the present invention starts from the knowledge of the fact that all the natural languages necessarily contain parts of speech and proposes that a sentence inputted for translation is considered to be composed of a pattern forming a string of parts-of-speech and that the sequence of target words as well as word inflections, such as the Japanese case inflections or particles of an output or target language, are decided on the basis of the sequence of the parts-of-speech and the pattern of the input sentence as a whole by referring to a previously stored or registered table, to thereby output the translated sentence by synthesizing the decided target words and word inflections.

DESCRIPTION OF THE PREFERRED EMBODIMENTS

Figure 1:
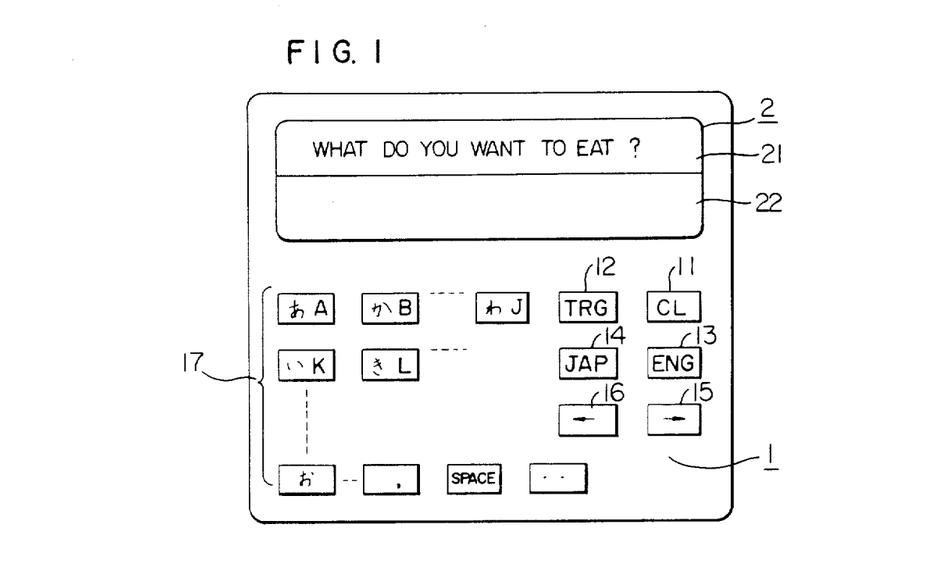
FIG. 1 shows in a plan view an arrangement of an input device and a display device according to an exemplary embodiment of the present invention.
Figure 2:
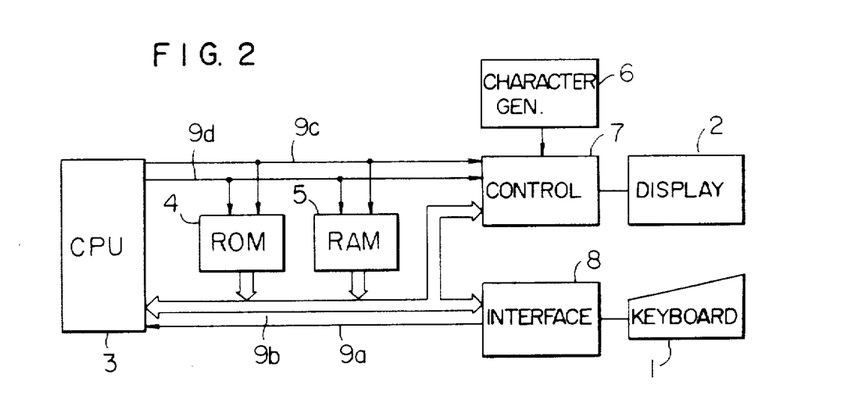
FIG. 2 is a block diagram showing a general arrangement of a translator apparatus according to an exemplary embodiment of the invention.

Referring to FIGS. 1 and 2 which show an arrangement and structure of a translator apparatus according to an embodiment of the present invention, the apparatus includes a key-board 1, a display device 2, a processing unit 3 (hereinafter referred to as CPU in an abridgement), a fixed value memory or read-only memory 4 (hereinafter simply referred to as ROM), a random access memory 5 (hereinafter simply referred to as RAM) and others.

The key-board 1 includes a start key or clear key 11, a translation trigger key 12, a source (English) input trigger key 13, a target (Japanese) input trigger key 13, a cursor key 15 for shifting a cursor to the right (also referred to as the rightward cursor shift key), a cursor key 16 for shifting a cursor to the left (also referred to as the leftward cursor shift key) and keys 17 for characters (also referred to as the character keys).

The display device 2 may be constituted by a liquid crystal display of 5×7 dot matrix configuration and includes a display field 21 for source input and a display field 22 for target output.

The CPU 3 is constituted by a micro-computer (e.g. HMCS 6800, Intel 8080 or the like) for executing translation processings in accordance with a a program described below.

Figure 3:
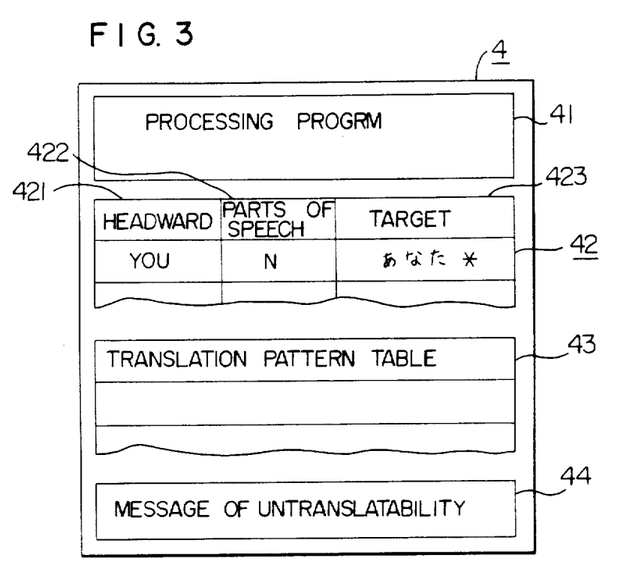
FIG. 3 shows schematically an exemplary storage configuration of a read-only memory or ROM used according to the invention.
Figure 4:
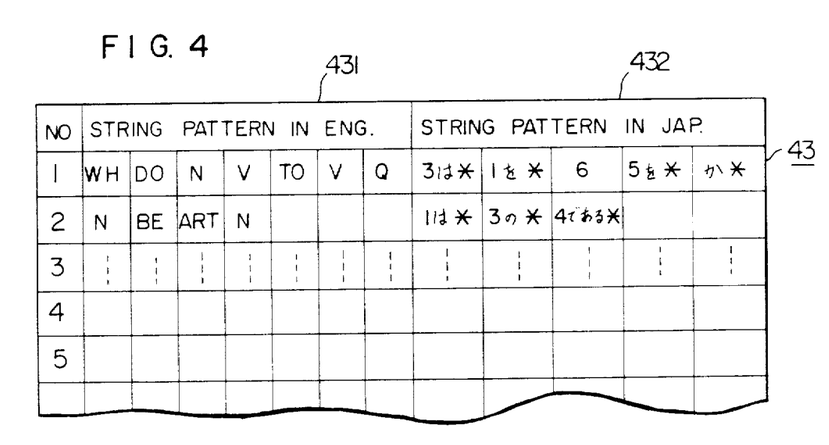
FIG. 4 shows a typical example of a table for translation patterns between strings of parts-of-speech.
Figure 6:
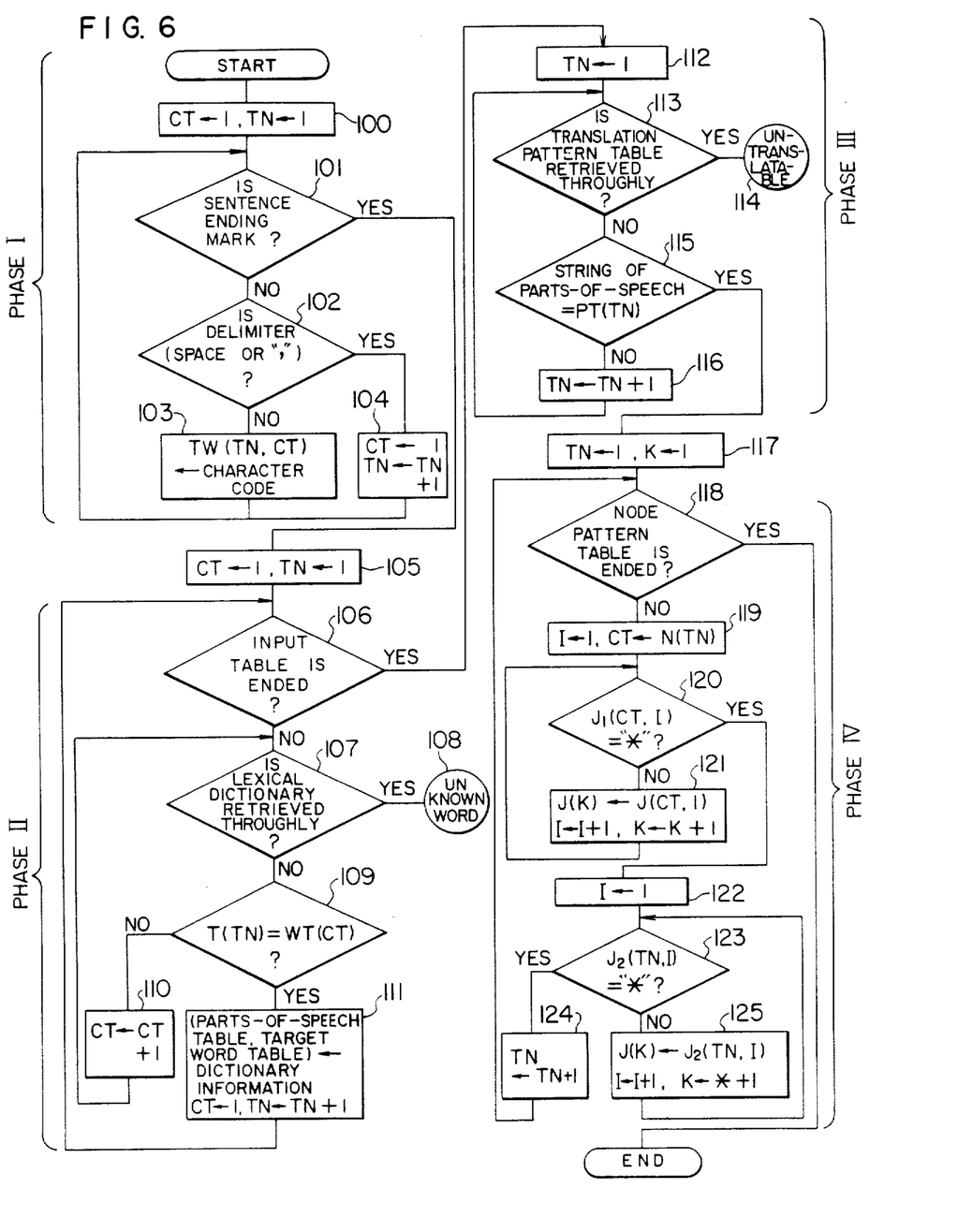
FIG. 6 is a flow chart illustrating, by way of example, procedures of processings for carrying out the invention.

The ROM 4 previously stores therein a processing program 41, a lexical or word dictionary 42, a translation pattern table 43 containing translation patterns between strings of parts-of-speech and an error message 44, as illustrated in FIG. 3. An example of the table 43 of translation patterns between strings of parts-of-speech is illustrated in FIG. 4, while an example of the processing program 41 is illustrated in FIG. 6. Detailed description thereof will be made later on.

Figure 5:
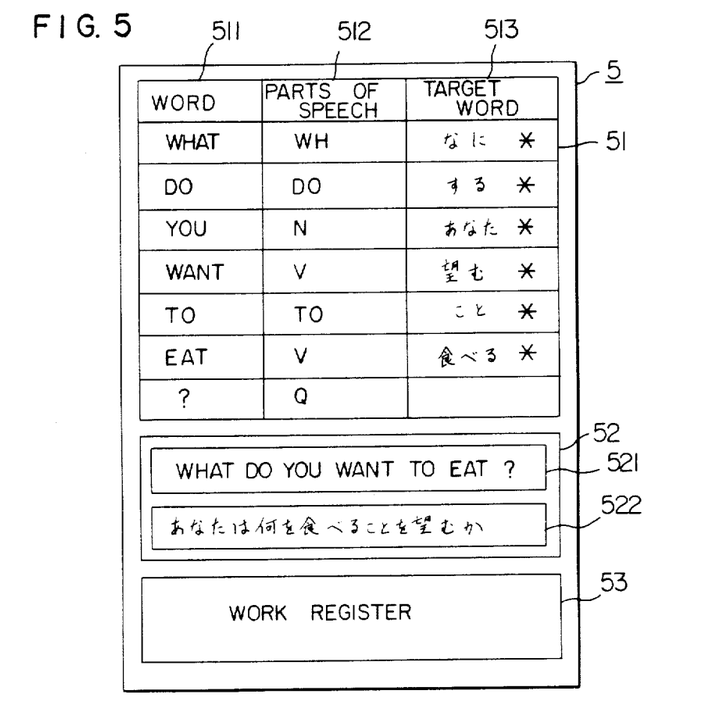
FIG. 5 shows schematically an exemplary storage configuration of a random access memory (RAM) used according to the invention.

There are prepared in the RAM 5 an interlingua table area 51, a buffer storage 52 for display and a work register storage 53. The interlingua table area (also referred to as the internal table area) 51 includes a table 511 for source (or input) words, a table 512 for parts-of-speech and a table 513 for target or output words. On the other hand, the buffer storage 52 for display includes an input buffer storage area 521 and an output buffer storage area 522.

Referring again to FIG. 2, a character generator 6 stores dot patterns and generates characters of codes designated through the key-board 1 and the CPU 3, which characters are to be displayed on the display device 2. A controller 7 serves for controlling the driving of the display device 2. The controller 7, the CPU 3, the ROM 4 and the RAM 5 are connected to one another by an address bus 9d and a control bus 9c, while the controller 7, a key-board interface 8, the CPU 3, the ROM 4 and the RAM 5 are mutually connected by a data bus 9b. Further, the interface 8 and the CPU 3 are connected to each other by an interrupt signal line 9a.

In the following, description will be made of operation of the translator apparatus.

When the start or clear key 11 is pushed, an interrupt request signal is sent to the CPU 3 through the key-board interface 8. In response to the interrupt request signal, operation of the CPU 3 performed until then is interrupted and the translation processing program 41 previously stored in the ROM 4 is activated, whereupon the interlingua (or internal language) table 51 and the buffer storage 52 for the display are first initialized (i.e. these storages are filled with codes indicative of blank).

Next, when certain ones of the character keys 17 are pressed, a corresponding source or input sentence is sent to the CPU 3 on a character-by-character basis. In accordance with the translation processing program 41, the codes corresponding to the input characters are successively stored in the input buffer storage area 521.

In this connection, it is desirable to provide cursors and the cursor shift keys 15 and 16 for indicating the location of the input character and location of correction. Detailed description about the control of the cursors will be omitted.

In the following description about the processings of the character codes will be made in terms of the character strings with the term "code" being omitted for the simplification of understanding. It will however be appreciated that the actual processings are executed by using the character codes.

The characters designated by the codes stored in the input buffer storage area 521 are taken out of the character generator 6 and displayed on the input (source) display field 21 of the display device 2.

FIG. 5 illustrates a state of the input buffer storage area 521 in which an English sentence "WHAT DO YOU WANT TO EAT?" is assumed to be inputted, by way of example, while the same sentence is displayed on the input display field 21 of the display device 2, as shown in FIG. 1.

Upon completion of the inputting of the source sentence, the user or operator is then permitted to push the translation trigger key 12, whereupon a code indicating the translation trigger command is sent to the CPU 3. Then, a translation process is executed in accordance with the processing program in response to this translation command in a manner illustrated in a flow chart shown in FIG. 6.

The translation process is executed in the following order, i.e. recognition of words from the input character string (referred to as phase I), access to the dictionary (phase II), access to the translation pattern table containing translation patterns between strings of parts-of-speech (Phase III) and generation or synthesization of a corresponding target sentence (phase IV). In the following, contents of the processing will be described by referring to FIG. 6.

PHASE I

First, variable CT and TN stored in the work register storage 53 are initialized to 1 (one) at a step 100. The variable TN indicates a row of the source word table 511 (FIG. 5), while the variable CT indicates the ordinal numbers of characters which constitute a word stored at a row in concern. Further, an expression TW (TN, CT) is used to designate a CT-th character stored at a TN-th row in the source word table 511. Thus, TW (1, 3) designates the character "A" of the word "WHAT" in the case of the example illustrated in FIG. 5.

At a next step, an Engish sentence stored in the input buffer storage area 521 is examined on a character basis (i.e. character-by-character) to decide whether or not the character being examined is an end mark (".", "?" or "!") of the sentence. When the end of the sentence is detected, the process will proceed to the phase II. Otherwise, a step 102 is executed.

At the step 102, it is decided whether the character in concern corresponds to a delimiter (i.e. a space or ","). When the result of decision is negative (i.e. NO), the character code in concern is stored in the input word table 511 at the position given by TW (TN, CT). On the contrary, when the result is affirmative, that is "YES", the processing proceeds to a step 104 where the variables CT and TN stored in the work register area 53 are, respectively, set to values which corresponds to the preceding values of CT and TN incremented by 1 (one), respectively. Thereafter, the routine returns to the step 101, and the processing routine described above is repeated.

As a consequence, in the illustrative case where the English sentence "WHAT DO YOU WANT TO EAT?" is assumed to be stored in the input buffer storage area 521, the word "WHAT" is stored at the first row, "DO" is stored at the second row, "YOU" is stored at the third row and so forth in the input (source) word table 511, as can be seen from FIG. 5.

PHASE II

In this phase, parts-of-speech information as well as target words corresponding to the individual words recognized in the phase I and stored in the input word table 511 are retrieved from the previously prepared lexical dictionary 42 and stored in the parts-of-speech table 512 and the target (output) word table 513, respectively, provided in the RAM 5. In this connection, mnemonics are previously determined for each of the parts-of-speech in a manner summarized in the following table 1.

TABLE 1
MNEMONICS OF SEVERAL PARTS-OF-SPEECH

| N | (pro)noun | NEG | negative |
| --- | --- | --- | --- |
| ADJ | adjective | WH | interogative pronoun |
| ART | article | HOW | interogative adverb |
| ADV | adverb | Q | question mark |
| AUX | auxiliary verb | EXC | exclamation mark |
| V | verb | BE | be verb |
| CNJ | conjuction | DO | do verb |
| PRE | preposition | TO | to infinitive |
| INT | interjection | ING | -ing form of verb |

The lexical dictionary 42 stores therein the parts-of-speech 422 and target words 423 in association with correspondent headwords 421. For example, the mnemonic "N" and the target word "あなた.*" (a Japanese word corresponding to "you" in English)" are stored in association with a headword "YOU", where the symbol "*" represents the end of the target word.

In the first place, the variables CT and TN are initialized to 1 (one), respectively, at a step 105, where the variable CT indicates the sequential order of the headwords in the lexical dictionary, while TN indicates the row number of the input word table 511. At a next step 109, a word stored at the TN-th row of the input word table 511 which word is assumed to be represented by T (TN) is compared with the headword stored at the CT-th location of the lexical dictionary 42 which headword is assumed to be represented by WT (CT). When the comparison results in no coincidence, the succeeding headwords, i.e. the headword stored at the (CT+1)-th location and the following are successively compared with the word T (TN) until coincidence is found (step 110), whereupon the parts-of-speech data 422 and the target word 423 of the lexical dictionary corresponding to the word T (TN) are transferred (copied) to the parts-of-speech table 512 and the target word table 513 at the TN-th row, respectively (step 111). Subsequently, the variable TN is incremented by 1 (one) while CT is initialized to 1 (one), to proceed to the retrieval of the following words in the input word table 511. When this procedure which is referred to as "access to the dictionary" has been completed for all the words stored in the input word table 511 (step 106), the processing proceeds to the next phase III.

When no headword corresponding to the word in the source or input word table 511 could be found in the lexical dictionary 42 after a through search thereof (step 107), the word in question is treated as an unknown word (step 108). In this case, it is desirable that "N" (noun) be placed in the parts-of-speech table with the input word itself (the very English word as inputted) being copied in the target or output word table in consideration of such subsequent processing that the translation of the English sentence including the unknown word is not given up but is performed with the unknown word remaining untranslated so that a translated sentence containing the unknown input word as it is can be displayed in the output display field 22 of the display device 2.

PHASE III

In this phase, translatability of the input sentence is determined on the basis of the sequence of the parts of speech, whereupon sequence of the target (translated) words and information of word inflection (or declension) are determined.

At first, the variable TN is initialized to 1 (one) at a step 112. The variable TN designates the numbers identifying the individual rows in the table 43 containing translation patterns between strings of the parts-of-speech. Next, decision is made as to whether or not the sequence of the parts of speech stored in the parts-of-speech table 512 coincides with the string of the parts-of-speech located at the TN-th row [this string of parts-of-speech is represented by PT (TN)] of a table 431 for acceptable English patterns of strings of parts-of-speech reserved in the translation pattern table 43 (step 115). When the result of comparison is negative (i.e. NO), the variable TN is incremented by 1 (one) and similar decision is made for the (TN+1)-th row and so forth (step 116).

The translation pattern table 43 contains definitions on the correspondence relationships between the acceptable English patterns of strings of parts-of-speech 431 and the correspondent (equivalent) sequences of Japanese words for translation (these sequences are referred to as the node patterns of Japanese or more generally the node patterns of the target language) 432. A typical example of the translation pattern table 43 is illustrated in FIG. 4.

By way of example, reference may be made to the first row of the table 43 shown in FIG. 4. It will be seen that, in case the sequence of words of an English sentence to be translated is in the order of (1) WH, (2) DO, (3) N, (4) V, (5) TO, (6) V and (7) Q, the sequence of words of the equivalent target Japanese sentence to be generated is in the order of (3) N は (wa)* where " は" (wa) is a Japanese case inflection or a Japanese particle suffixed to a subject word, (1) WH を (wo)* where "を" (wo) is a Japanese case inflection of a Japanese particle suffixed to an object word, (6) V, (5) TO を (wo)* and " か (ka)*" which is a Japanese suffix attached to the end of a sentence in place of the question mark. Similar rule holds true in other rows of the table 43.

Again referring to FIG. 6, it is determined at a step 113 whether the sequence of parts of speech corresponding to the input English sentence is present or not in the translation pattern table 43 throughout all the rows. When no string of the parts of speech corresponding to the input English sentence is present, it is decided that the English sentence is of "untranslatable" at a step 114, whereupon the untranslatable message previously stored in the ROM 4 is transferred to the output buffer storage area 522 to be displayed by the output display device 22.

On the other hand, when there exists in the table 431 of acceptable English patterns of strings of parts-of-speech registered in the translation pattern table 43 a string of parts-of-speech which is identical with the sequence of the parts-of-speech stored in the parts-of-speech table 512, then the correspondent Japanese node pattern 432 registered in the translation pattern table 43 is considered as the information of the word sequence and inflections (i.e. Japanese particles such as "wa", "wo", "ka" and others) to be outputted. The procedure then proceeds to the phase IV.

PHASE IV

In this phase, a target or output sentence corresponding to the input sentence which is decided to be translatable is synthesized or generated.

In the following description, the numbers attached to the row of the node patterns 432 which are registered in the pattern translation table 43 and decided to be translatable will be omitted for simplification. In the case where the processing is described by a programming language which is incapable of designating an array of three or more dimensions, the row or item may be once transferred to the work area 53 of the RAM, to thereby make the row or item number unnecessary. Further, it is also assumed that the node pattern 432 of the target language or Japanese at the row identified by the number in concern is represented by sets of numerals and possibly required target words for inflections (suffixed particles), as is illustrated in FIG. 4. It will readily be seen that the numeral (which may be referred to as node numeral) used in the node pattern of Japanese represents the word which occupies the ordinal position identified by said numeral in the input sentence. For example, a node numeral (3) represents a target (output) word for the third word in the input sentence. It is further assumed that I-th character of a target word corresponding to a CT-th word of an input sentence is represented by an expression: $J_1$ (CT, I). Further, the node numerals in the TN-th node pattern of Japanese in the Japanese (or target) node pattern table 432 is represented by N (TN), while the suffix word or particle for Japanese case inflection is represented by $J_2$ (TN) with the I-th character in the suffix word being represented by $J_2$ (TN, I).

In the phase IV, the variables TN and K are, respectively, initialized to 1 (one) at first at a step 117.

Next, a Japanese or target word corresponding to an English or input word as represented by N (TN) (e.g. a Japanese word corresponding to YOU indicated by the third part of speech in the input English sentence since N (1)=3) is transferred from the target word table 513 to the output buffer storage area 522 on a character-by-character base at a step 119. In this connection, it is assumed that a K-th character in the output buffer storage area 522 is represented by J (K). At a step 120, it is decided whether or not a word ending mark (which may also be referred to as the end mark for characters) previously assigned to a target word such as "*", for example, makes an appearance. Upon appearance of the end mark in concern, it is determined that the target word equivalent to the input word has been transferred. By way of example, in the case of the processing of the node pattern of Japanese given at N (1) in the table 432, the target Japanese word "あなた (anata as spelled phonetically)" equivalent to "YOU" in the input English sentence has been transferred to be loaded in the output buffer storage area 522 upon appearance of the assigned end mark "*". Unless the end mark makes appearance, the next step 121 is executed to repeat the processing mentioned above.

Subsequently, processing of the word inflection information to suffix a relevant particle to the target word is carried out. In other words, when the word "YOU" is concerned, the processing to add the Japanese suffix word "は (wa)" to the word "あなた (anata)" is conducted. To this end, the variable I is first initialized to 1 (one) at a step 122. Next, the output or target suffix word (or particle) for Japanese case inflection is sequentially transferred to the output buffer storage area 522 on the character-by-character base to be added to the target word already stored therein (step 125). Next, at a step 123, it is decided whether or not the end mark previously assigned to the suffix word or particle such as "*", for example, makes an appearance. If the result of the decision is affirmative (i.e. YES), it is determined that the transfer of the suffix word in concern has been completed, whereupon the processing proceeds to a subsequent (TN+1)-th set of the node numeral and the word inflection information (step 124). Unless the end mark "*" appears, the target word for the suffix word in concern is updated at a step 125. In this manner, the target word corresponding to the input word and represented by the node numerals as well as the relevant suffix word or particle for inflection are sequentially transferred to the output buffer storage area 522. As the consequence, there is placed at the output buffer storage area 522 a whole target (output) sentence, as is illustrated in FIG. 5. When a blank node makes appearance in a string of nodes for a Japanese sentence as illustrated in FIG. 4, it is determined that generation of the target (Japanese) sentence has been completed, whereupon a full-stop mark (i.e. "o (small circle)") is added in succession to the end of the target sentence now stored in the output buffer storage area 522. Finally, the content of the output buffer storage area 522 is displayed on the display device 2 at the display field 22 (FIG. 1) through operation of the controller 7.

In the foregoing, an exemplary manner in which the invention can be carried out has been described. In this conjunction, it should be mentioned that specifically defined parts-of-speech which fall outside the purview of the grammatical parts of speech may be additionally prepared and used with a view to increasing the success rate of translation. For example, artificial parts of speech such as "IT" and "THR" may be prepared for the words "it" and "there", respectively, so that sentences of specific syntax patterns such as those including "it" as an antecedent (formal subject of a sentence) or the sentence beginning with "There is . . . " can be translated.

Moreover, it is possible to translate such specific sentences which have heretofore been untranslatable even with the aid of the complicated syntax parsing hitherto known by applying some inventive modification to the configuration of the table (43) for the translation patterns between strings of parts-of-speech. For example, an English sentence "They are flying planes" may be interpreted in two different meanings as follows:

(a) "People are enjoying themselves by flying model planes." and (b) "Those which you see are planes which are flying in the air."

Thus, the sentence "They are flying planes." can not be translated definitely into a sentence of another language by the hitherto known method resorting to the syntax analysis or parsing. However, this difficulty can be solved by the present invention in a manner mentioned below.

Figure 7:
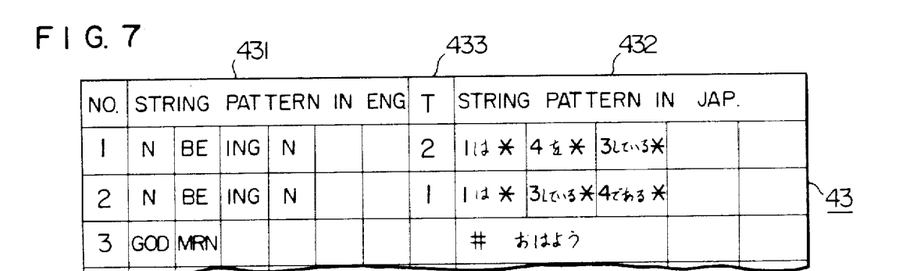
FIG. 7 shows another example of a table for translation patterns between strings of parts-of-speech.

According to a feature of the invention, a part-of-speech "BE (present tense of "be verb")" is prepared for "are" to discriminate it from the common verbs, and additionally the translation pattern table 43 is configured in such an arrangement as illustrated in FIG. 7. More specifically, two different node patterns are stored in succession in the Japanese node pattern table 432, while numerals representative of the number of logically possible target (Japanese) sentences are stored at regions labelled with T. The numeral "2" in the region T means that the Japanese node pattern attached with the numeral "2" is followed by some other Japanese node patterns which correspond with grammatical significance to the same string of the parts-of-speech of the single input (English) sentence, while the numeral "1" means that the node pattern attached with this numeral is the last one of the set of possible node patterns.

The numeral (T) can be placed at a predetermined location in the display buffer storage 52 upon execution of translation and displayed by the display device 2 to thereby furnish the operator or user with the information as to how many output (Japanese) sentences the single input (English) sentence can have (i.e. ambiguities of the input or English sentence). Thus, when the output sentence generated on the basis of the first node pattern is found inappropriate, the user then inputs a predetermined code to thereby allow another target sentence to be generated in correspondence to the same input sentence on the basis of another node pattern. This procedure is repeated until the user encounters the most appropriate target (output) sentence. Further, in the case where a target (output) sentence which was once displayed in the course of the repeated operation mentioned above is found to be the most appropriate after all, then the generation of the most appropriate target sentence may be restored or alternatively the operation may be repeated again starting from the first node pattern to thereby catch the most appropriate target sentence. This can be accomplished by correspondingly preparing the program 41.

When a string of words which has a special meaning (e.g. idiom) has to be translated in accordance with the teaching of the invention, it is required to take some measures such as expansion of the dictionary accessing process. When a sentence is to be regarded as an idiom as a whole (i.e. the sentence manipulated as a whole), translation of it can be effected by preparing a specially defined part-of-speech, as described hereinbefore. For example, in the case of a sentence "Good morning", the specifically defined parts of speech such as "GOD" and "MRN" may be prepared for "good" and "morning" and registered in the translation pattern table 43 in a pattern illustrated in FIG. 7 at the third row.

When a symbol "#" is recognized in a Japanese node string pattern 432 in the phase IV for generation of the target (output) sentence, then the target sentence is constituted by a string of characters succeeding this symbol # and followed by a blank. However, from the standpoint of flexibility of the translator apparatus, it is more desirable to expand the dictionary accessing process. In this case, the translation through a single pattern matching between the sequences of the parts-of-speech according to the invention can be easily realized by adopting such arrangement that an idiom is categorically defined by one part of speech (e.g. noun).

The foregoing description has been made on the assumption that an English sentence is to be translated into a Japanese sentence. It is however needless to say that the reverse translation (i.e. Japanese-into-English translation) is equally possible. In this case, a Japanese sentence to be translated is manually sectioned and inputted to the translator. Alternatively, some means may be provided for preparing the input string of words in the same manner as the sentence is sectioned and inputted. For example, it is assumed that a Japanese sentence " あなたは何が欲しいですか (Anatawa naniga hoshiidesu ka)" is to be translated into English. Then, a string of words " あなた (anata: "you" in English)", " は (wa: a particle suffixed to a subject word)", "何 (nani: "what" in English)", " が (ga: a suffix attached to an object word)", " 欲しい (hoshii: "want" in English)" and " ですか (desuka: a Japanese question phrase)" is inputted in this sequence.

Figure 8:
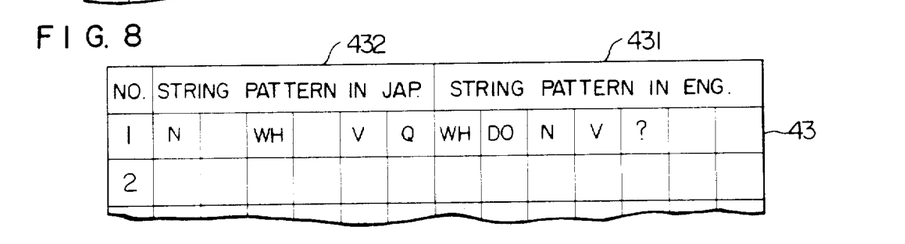
FIG. 8 shows still another example of a table for translation patterns between strings of parts-of-speech (Japanese into English).

Since particles of Japanese carry important information such as that of case inflections, it is often impossible to perform the correct translation only by allotting the particle as the part-of-speech to the Japanese words serving as the particles. Accordingly, there are prepared special particles " ハ (wa: a square Japanese syllabary corresponding to " は")" and " ガ (ga: a square Japanese syllabary corresponding to " が")" for the particles " は (wa)" and " が (ga)", respectively. Strings of Japanese parts-of-speech (432) and corresponding node patterns for English (target) sentences (431) are registered in the translation pattern table 43 in a manner illustrated in FIG. 8. It is thus possible to perform the Japanese-into-English translation through the utterly same procedures as those for the English-into-Japanese translation. Moreover, when the particles which may be categorized by two or more parts of speech (g.g. " は (wa)" which is categorized by both of "paticle for subjective case" and "particle for limitation") are allotted with specifically prepared parts-of-speech (e.g. by preparing " ハ " mentioned above), the phenomenon of the ambiguity described hereinbefore (i.e. posibility of generation of a number of target sentences from a single input sentence) can be significantly reduced.

The invention described in the foregoing brings about following advantages.

(1) So far as the patterns of sentences which are registered in the table of translation patterns between strings of parts-of-speech (i.e. the translation pattern table) are concerned, translation can be effected in a simplified manner at a high speed with an increased reliability only by a single pattern matching of a sentence as a whole.

(2) The number of sentences of translatable patterns can be increased independent of and compatible with the sentences of other established patterns by preparing additionally special parts of speech and increasing correspondingly the number of patterns registered in the translation pattern table (which should then preferably be stored in the RAM).

(3) A required storage or memory capacity can be significantly reduced as compared with the translator of the second type described hereinbefore. For example, let's assume that a given one of the strings of parts-of-speech registered in the translation pattern table is represented by $P_1, P_2, \ldots, P_m$ where $P_i \epsilon$ (N, V, ADJ, ...) and $i=1, \ldots, m$, and the sentence of this pattern is to be translated. When the number of words which belong to the respective parts-of-speech categories and registered in the lexical (word) dictionary is represented by $n(P_i)$, it is sufficient to register the single pattern mentioned above together with the lexical dictionary containing the words in number equal to $n(P_1)+ \ldots +n(P_m)$ for carrying out the translation according to the present invention. Besides, the only procedure as required is to input a source text. In contrast, the hitherto known translation requires registration of the sentence patterns in number equal to $n(P_1) \times n(P_2) \times \ldots \times n(P_m)$. Besides, extremely complicated and troublesome procedures and processings are required, since a sentence to be designated for translation has to be selected from such an enormous number of the registered sentence patterns.

We claim:

1. A method of performing translations between first and second natural languages comprising:
   - a first step of sectioning a source text described by a first natural language word by word and storing the words in storage;
   - a second step of deriving information regarding the parts-of-speech of the stored source words through retrieval of the parts-of-speech information from a lexical dictionary storage in which words are registered together with information regarding the parts-of-speech thereof;
   - a third step of deriving target words in the second natural language which are equivalent in meaning to the respective stored source words in the first natural language;
   - a fourth step of translating a first pattern of a string of parts-of-speech formed by gathering the parts-of-speech for each of the stored source words derived in said second step into a pattern in which the order of the parts-of-speech is in accordance with said first natural language, into a second pattern of a string-of-parts of speech with an order in accordance with said second natural language by referring to a translation pattern table which registers therein the correspondences between first patterns of parts-of-speech strings defining sequences of parts-of-speech of the first natural language and second patterns of parts-of-speech strings defining sequences of parts-of-speech of the second natural language; and
   - a fifth step of generating a sentence in the second natural language by sequencing said target words in accordance with the sequential order of the parts-of-speech in said translated second pattern of the string of parts-of-speech of said second natural language.

2. A method of performing translation between natural languages according to claim 1, wherein the source words are extracted from the source text through a character-based examination with the aid of a space and/or a punctuation serving as a delimiter symbol at said first step.

3. A method of performing translation between natural languages according to claim 1, wherein the information regarding each of the parts-of-speech registered in said lexical dictionary storage includes at the end thereof a mark representing the end of said information.

4. A method of performing translation between natural languages according to claim 1, wherein when a source word from the source text is absent in said lexical dictionary storage, said source word is assigned the parts-of-speech of a noun and is itself used as the target word.

5. A method of performing translation between natural languages according to claim 1, wherein information of the parts-of-speech includes specifically prepared parts-of-speech intended to be used for designating special words as opposed to grammatical parts-of-speech.

6. A method of performing translation between natural languages according to claim 1, wherein said second parts-of-speech string pattern registered in said translation pattern table includes information of word sequence and suffix words in said second natural language.

7. A method of performing translation between natural languages according to claim 1, wherein said translation pattern table includes an area for indicating whether a plurality of the sentences in said second natural language which correspond to a single source sentence in said first natural language are present or not.

8. A method of performing translation between natural languages according to claim 1, wherein when said translation pattern table has registered therein no first pattern of a string of parts-of-speech which corresponds to the string of parts-of-speech of the source text, a message indicative of inability to translate said source sentence is displayed.

9. A method according to claim 1, wherein said lexical dictionary storage also stores therein target words in the second natural language corresponding in meaning to a plurality of words in said first natural language, and wherein said third step comprises retrieving said target words from said lexical dictionary storage for each of said stored source words.

10. An apparatus for translating a sentence described by a first natural language into a sentence described by a second natural language, comprising:
   - a keyboard means for inputting the sentence described by said first natural language on a character-by-character basis;
   - keyboard interface means for converting the inputted characters from said keyboard means into corresponding codes to be supplied to a processing unit;
   - fixed storage means storing therein a dictionary of words including words in the first natural language, parts-of-speech thereof and corresponding words in the second natural language and a translation pattern table defining correspondences between patterns of strings of parts-of-speech relevant to said first natural language and patterns of strings of parts-of-speech relevant to said second natural language;
   - a random access memory having buffer memory areas for temporarily storing an input sentence and an output sentence;
   - processing means for retrieving said dictionary of words to obtain information of the parts-of-speech and a corresponding word in the second natural language for each word of an input sentence in the first natural language, storing the information in said random access memory, retrieving said translation pattern table to obtain a pattern of a string of parts-of-speech in the second natural language corresponding to the pattern of a string of parts-of-speech of the input sentence in said random access memory, arranging corresponding words in the second natural language according to the retrieved pattern of string of parts-of-speech in the second natural language to compose an output sentence and storing the output sentence in said random access memory; and display means for displaying the input sentence and the output sentence both stored in said random access memory.

11. An apparatus for performing translations between first and second natural languages comprising:

means for sectioning a source of text described by a first natural language word by word and for storing the words in a storage;

a lexical dictionary storage in which words are registered together with information regarding the parts-of-speech thereof;

means for deriving information regarding the parts-of-speech of the stored source words through retrieval of the parts-of-speech information from said lexical dictionary storage;

means for producing target words in the second natural language which are equivalent in meaning to the respective stored source words in the first natural language;

means for translating a first pattern of a string of parts-of-speech formed by gathering the parts-of-speech for each of the stored source words derived in said second step into a pattern in which the order of the parts-of-speech is in accordance with said first natural language, into a second pattern of a string-of-parts of speech with an order in accordance with said second natural language by referring to a translation pattern table which registers therein the correspondences between first patterns of parts-of-speech strings defining sequences of parts-of-speech of the first natural language and second patterns of parts-of-speech strings defining sequences of parts-of-speech of the second natural language; and means for generating a sentence in the second natural language by sequencing said target words in accordance with the sequential order of the parts-of-speech in said translated second pattern of the string of parts-of-speech of said second natural language.

* * * * *